US006925671B1

(12) United States Patent
Mouton

(10) Patent No.: US 6,925,671 B1
(45) Date of Patent: Aug. 9, 2005

(54) PIG LAUNCHER

(75) Inventor: Kevin J. Mouton, Longville, LA (US)

(73) Assignee: Marathon Ashland Petroleum LLC, Findlay, OH (US)

( * ) Notice: Subject to any disclaimer, the term of this patent is extended or adjusted under 35 U.S.C. 154(b) by 36 days.

(21) Appl. No.: 10/970,311

(22) Filed: Oct. 20, 2004

(51) Int. Cl.[7] .................................................. B08B 9/04
(52) U.S. Cl. ............... 15/104.062; 15/3.5; 15/104.061; 137/268
(58) Field of Search ............................ 15/3.5, 104.061, 15/104.062; 89/1.3, 33.05, 33.14, 33.5; 42/51, 42/95

(56) References Cited

U.S. PATENT DOCUMENTS

| | | | | |
|---|---|---|---|---|
| 3,404,421 A | * | 10/1968 | Surber | .................... 15/104.062 |
| 3,961,493 A | * | 6/1976 | Nolan, Jr. et al. | .......... 405/158 |
| 4,314,577 A | * | 2/1982 | Brister | ........................ 137/13 |
| 5,104,595 A | | 4/1992 | Hunter | |
| 5,208,937 A | | 5/1993 | Cooper | |
| 5,601,763 A | | 2/1997 | Hunter et al. | |
| 5,769,955 A | | 6/1998 | Kozisek | |
| 5,884,656 A | * | 3/1999 | Smith | .......................... 137/268 |
| 5,927,319 A | * | 7/1999 | Burkhalter | .................. 137/268 |
| 6,079,074 A | * | 6/2000 | Ellett | ..................... 15/104.062 |
| 6,500,271 B1 | | 12/2002 | Moore et al. | |

* cited by examiner

*Primary Examiner*—Robert J. Warden, Sr.
*Assistant Examiner*—Brad Y. Chin
(74) *Attorney, Agent, or Firm*—Emch, Schaffer, Schaub & Porcello Co. L.P.A.

(57) ABSTRACT

The ability to pig a pipeline is considered necessary and vital to most pipeline operations. The present invention provides a pig inserting apparatus and method designed to satisfy the need to Insert pigs for large diameter gasoline pipelines that are made of concrete and weigh in excess of 400 pounds. In the past, the industry has used ineffectively manpower or motorized vehicles to insert the pigs. This pig launcher uses a means for propelling the pig that includes: a spool rotatably mounted. The pair of cables is connected to the spool and engage the ends of the cantilevered arms for propelling the pig a pair of cantilevered arms, and a pair of cables of sufficient strength to firmly fasten onto the end of a pipeline.

20 Claims, 3 Drawing Sheets

PIG LAUNCHER

TECHNICAL FIELD

This invention relates to a method and apparatus for launching pipeline pigs. More specifically, the invention relates to a pipeline pig launcher for heavy pigs.

BACKGROUND OF THE INVENTION

Most pipelines which carry fluids (e.g. petroleum, natural gas, two-phase fluids, etc.) need to be "pigged" at certain times. This is accomplished by inserting or "launching" a "pig" into the pipeline at a first point and allowing the fluids flowing through the pipeline to push the pig through the pipeline to a second point where it is "caught" and removed from the pipeline. As understood in the art, the term "pig" is used to generically describe any structure or device which freely moves through a pipeline to carry out a particular function.

Normally, pipeline pigs fall into two basic categories, i.e. non-intelligent pigs and intelligent pigs. Non-intelligent pigs are those which perform maintenance or operational functions, e.g. cleaning—such as scraping of solids, etc. from the interior of the pipe—; swabbing—such as removing liquids or gases from the pipeline—; batching—such as separating different fluids in the pipeline—, etc. Intelligent pigs are those which monitor and convey information about a particular condition or performance of the pipeline.

Certain pigs for large diameter gasoline pipelines are made of steel and rubber and sometimes foam and weigh in excess of 400 pounds. In the past, the industry has used manpower to insert these pigs. Typically this takes upwards of six men to do the job. In wet, muddy, rainy conditions, the use of manpower is not very effective and creates a safety issue. Other methods for inserting heavy pigs employ trucks to push the pig. The use of trucks, however, provides a source of ignition which also creates a safety issue.

BRIEF DESCRIPTION OF THE INVENTION

The ability to pig a pipeline is considered necessary and vital to most pipeline operations. The present invention provides a pig inserting apparatus and method designed to satisfy the aforementioned needs. The launcher need not be flanged or threaded onto the pipe. Instead it is secured to the existing pipe line flange.

The pig launcher of this invention is for inserting an over weight pig into a pipeline. Included is a pig; a means for supporting the pig; and, a means for propelling the pig. A docking station supports the means for propelling the pig. The base launcher also includes a rod having a first end attached to the pig and a second end attached to the base; a pair of cantilevered arms attached to the base extending in opposite directions from the base wherein the cantilevered arms are perpendicular to the rod; and a pair of cables of sufficient strength to firmly fasten onto the end of a pipeline. The pair of cables engage the distal ends of the cantilevered arms and are attached to the means for propelling the pig.

Other objects and advantages of the present invention will become apparent to those skilled in the art upon a review of the following detailed description of the preferred embodiments and the accompanying drawings.

DETAILED DESCRIPTION OF THE INVENTION

The means for propelling the pig includes: a turret rotatably mounted and a spool rotatably mounted on the turret, wherein the pair of cables is connected to the spool.

The cantilevered arms include a pulley attached to the distal ends of the arms and the pair of cables rotatably engages the pulleys.

Figure 1:
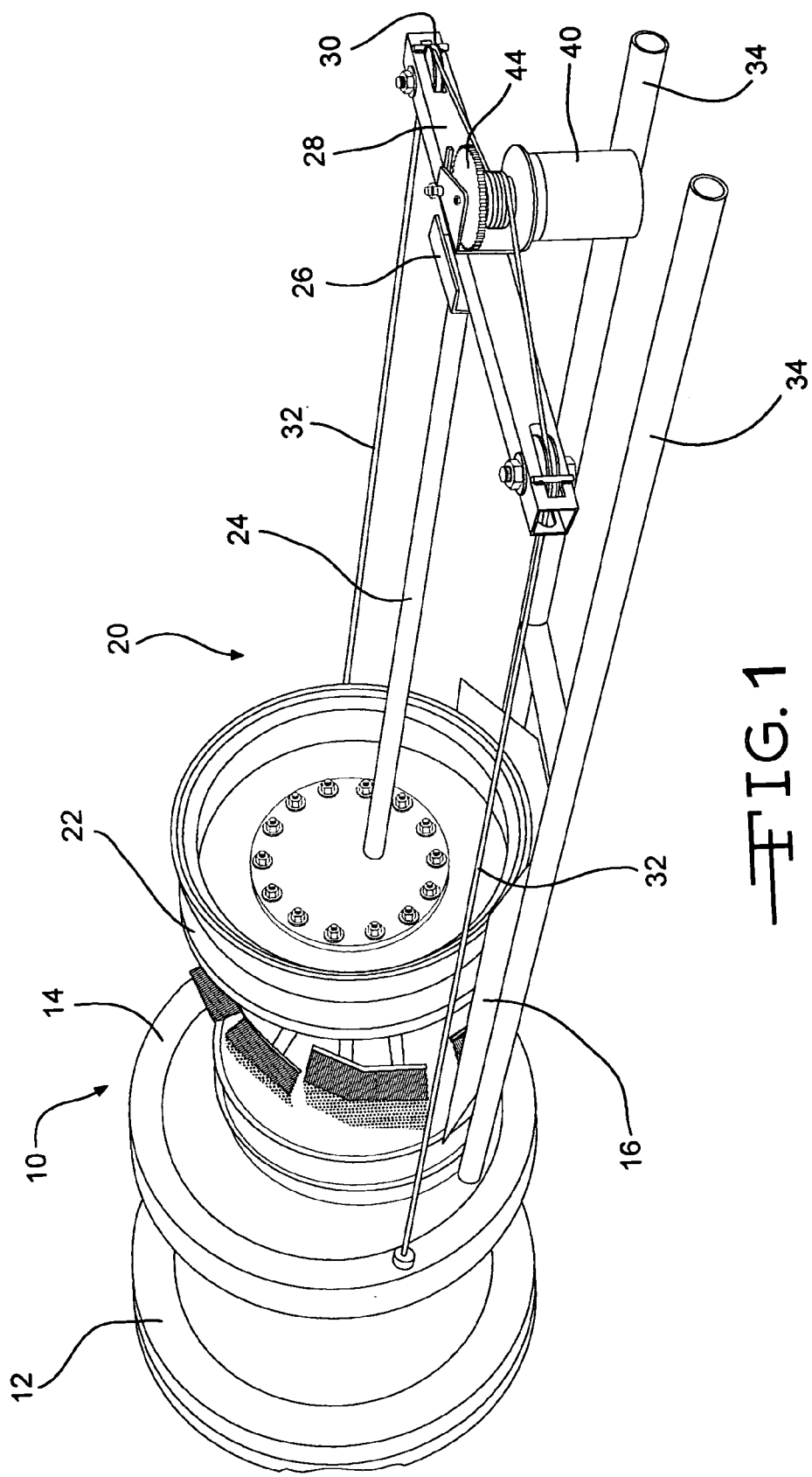
FIG. 1 is an illustration of the pig launching apparatus of the present invention as the launcher as it is being positioned between a docking station and the end of a pipeline.

FIG. 1 shows pipeline 10, pig launching apparatus 20 and docking station 40. Pipeline 10 includes flange 12 and cover plate 14. Cover plate 14 opens to provide access to the interior of pipeline 10. Pig launching apparatus 20 includes pig 22, rod 24, base 26, cantilevered arms 28, pulleys 30, cables 32 and rails 34. Docking station 40 includes turret 42, spool 44, motor 46, 48 and PLC 50.

Figure 2:
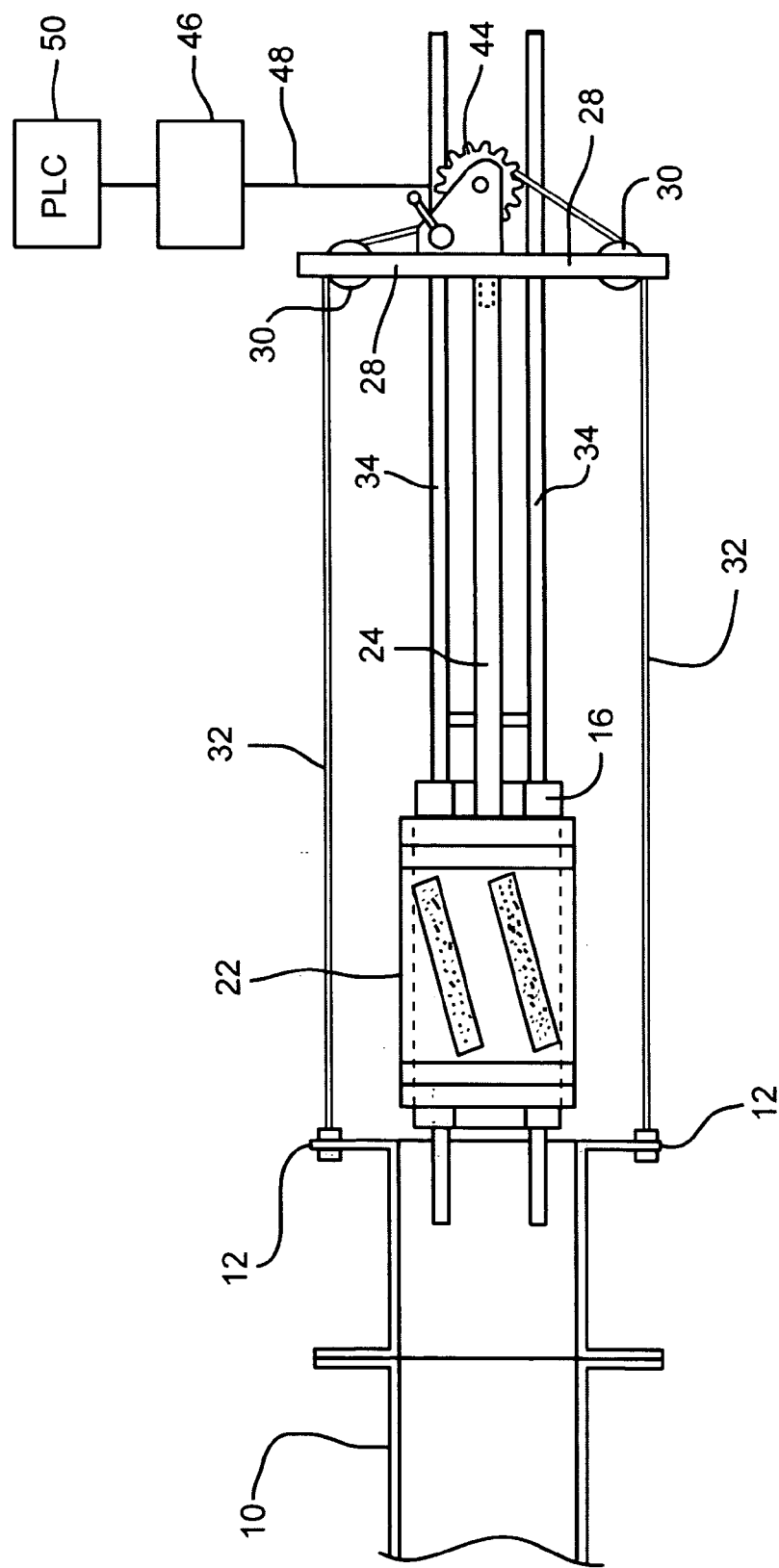
FIG. 2 is a top schematic illustration of the pig launching apparatus of the present invention.

FIG. 2 is a top schematic illustration of the pig launching apparatus of this invention. Hooks (not shown) connect cables 32 to flange 12. Pig 22 slidably engages rails 34 and freely moves between docking station 40 and pipeline 10 as spool 44 winds or unwinds cables 32. Motor 46 typically is an air driven motor or pneumatic motor. Drive 48 is compressed air powered. Programmable controller, PLC 50, includes conventional circuitry, wiring, sensors and the like (not shown). Pig 22 typically is an overweight or heavy pig and often weighs more than 400 pounds. The particular pig employed was made of concrete and weighed 410 pounds.

Figure 3:
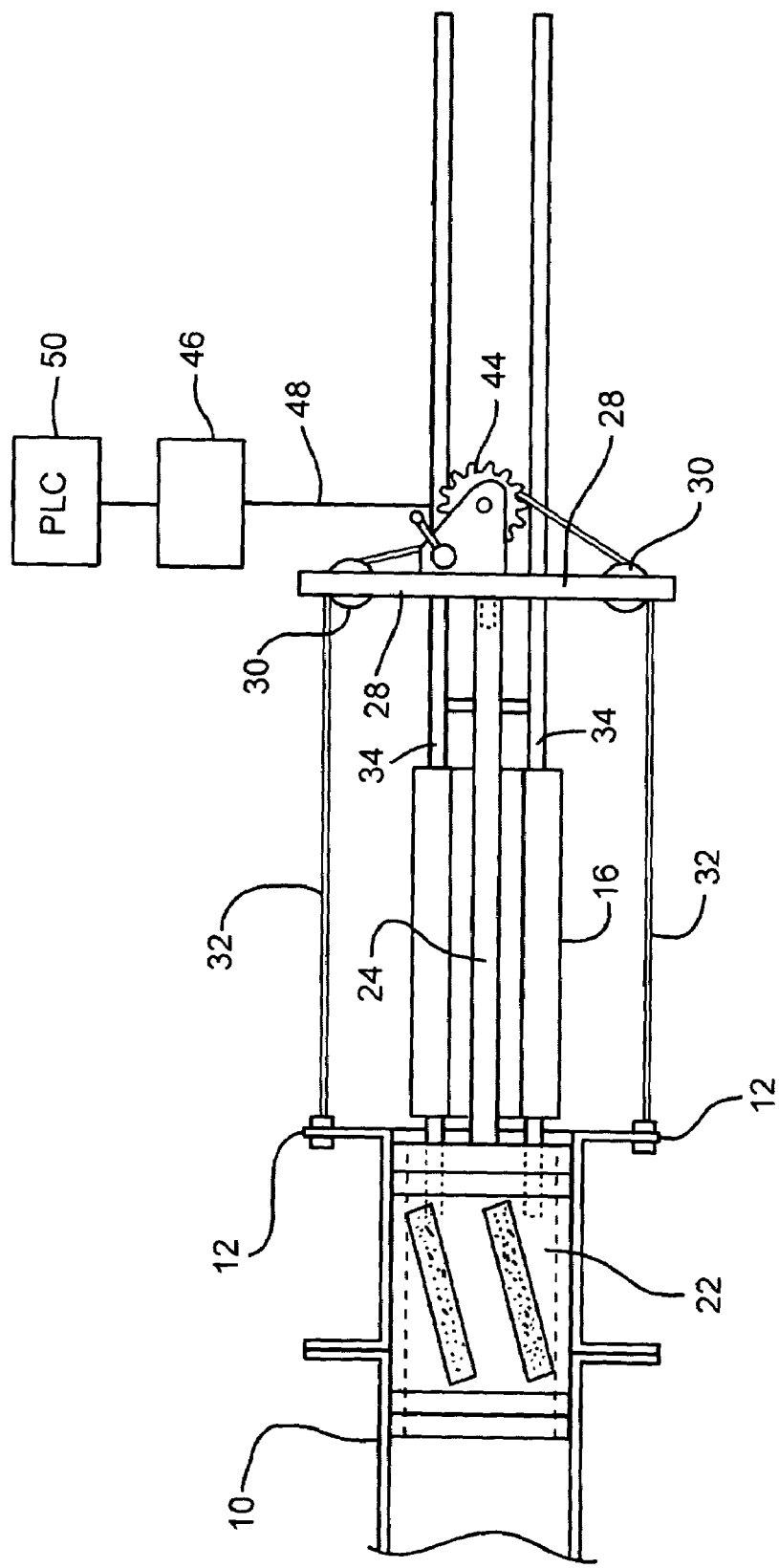
FIG. 3 is an illustration of the pig partially launched into a pipeline.

FIG. 3 illustrates pig launching apparatus 20 partially launching pig 22 into pipeline 10. Cradle 16 carries pig 22 over rails 34.

The apparatus is ideally constructed of stainless steel for its non-corrosive properties but, aluminum carbon steel or other materials may also be used.

Pipelines used in the petroleum industry vary greatly in size. Typical lines range from 4 inches in diameter to over 42 inches in diameter. They are constructed in both onshore and offshore locations. During the construction, before the pipelines can be used, they must be cleaned and tested. The lines are typically cleaned by washing out the lines with water and detergent and then inserting and forcing through the line an oversized pig or swab.

The pig especially is suitable for cleaning gasoline pipelines with large diameters. However, with small adjustments, the pig also is suitable for cleaning the interior of pipelines transporting other types of media, including, but not limited to, crude oil and asphalt.

The function of the brushes generally, is to mechanically clean the internal surface of the pipeline and, simultaneously, agitate impurities into a position which enables catching the metal impurities and to transfer them into the final place of the cleaning. Scrapers also may be fixed on the external surface of the pig.

The pig will provide, as a practical matter, the removal of all kinds of impurities appearing in pipelines, either of metal origin, as for example impurities arising from the abrasive wearing, impurities which remained in the pipeline systems after their construction, especially welding electrodes and their residual parts, iron scales, or other impurities as, for example, condensates. The structure and mutual arrangement of the individual parts of the device are based on the device's requirement to simultaneously slide and rotate to accomplish the cleaning. Regulation of the forward speed of the pig in combination with the revolution of the device around its longitudinal axis, will properly clean the internal space of the pipeline from metal particles while evenly distributing the caught particles around the outside circumference of the pig.

Pig 22 may vary widely. The pig is a pipeline interior surface cleaning device that is propelled through the pipeline by the operational properties of the transported medium. A speed regulator controls the rate of forward motion of the device. Sealing members, scraping elements, brushes and magnets may be used to loosen and collect particles on the interior pipeline surface as the cleaning device moves through the pipeline. The pipeline pig for removing scales and debris from the interior walls of a pipeline may have a generally cylindrical central portion with a hollow core and a rounded end on each two ends of the cylindrical central portion. It may be produced of a flexible material to facilitate the movement of the pipeline pig through non-linear sections of a pipeline and buildups of scale and debris in a pipeline.

Motor 46 typically is an air driven motor or pneumatic motor. Air driven motors allow for efficient, cool running, high speed applications. These motors are more efficient than electric motors. Simply attach to high pressure air supply to develop horsepower and rpm. These air motors are ideal for areas that are combustible in nature or when hi-speed is required. Pneumatic and air-driven motors are powered by compressed air and many operate at relatively high speeds in industrial and spark-prohibited applications. Motor 46 typically runs 900 to 1000 rpm's @ a torque of 90 lbs.

In addition to these embodiments, persons skilled in the art can see that numerous modifications and changes may be made to the above invention without departing from the intended spirit and scope thereof.

I claim:

1. A pig launcher for inserting an over weight pig into a pipeline comprising:
   a pig;
   a means for supporting the pig;
   a means for propelling the pig;
   a docking station supporting the means for propelling the pig;
   a base;
   a rod having a first end attached to the pig and a second end attached to the base;
   a pair of cantilevered arms attached to the base extending in opposite directions from the base wherein the cantilevered arms are perpendicular to the rod; and
   a pair of cables of sufficient strength to firmly fasten onto the end of a pipeline;
   wherein the pair of cables engage the distal ends of the cantilevered arms and wherein the pair of cables are attached to the means for propelling the pig.

2. A pig launcher according to claim 1 wherein the means for propelling the pig includes:
   a turret rotatably mounted; and
   a spool rotatably mounted on the turret, wherein the pair of cables is connected to the spool.

3. A pig launcher according to claim 1 wherein the cantilevered arms include a pulley attached to the distal ends wherein the pair of cables rotatably engages the pulleys.

4. A pig launcher according to claim 1 wherein the means for supporting the pig is a pair of rails parallel to the rod.

5. A pig launcher according to claim 4 wherein the pig slidably engages the pair of rails.

6. A pig launcher according to claim 4 wherein a sled supports the pig.

7. A pig launcher according to claim 6 wherein the sled slidably engages the pair of rails.

8. A pig launcher according to claim 4 wherein the pair of rails extends from the docking station to the end of a pipeline.

9. A pig launcher tool according to claim 1 including a pneumatic motor connected to the means for propelling the pig.

10. A pig launching tool according to claim 1 including a motor powered by compressed air connected to the means for propelling the pig.

11. A pig launcher according to claim 1 including an air driven motor connected to the means for propelling the pig.

12. A pig launcher according to claim 11 including a programmable controller (PLC) controlling the motor.

13. A pig launcher according to claim 1 wherein the pig includes a means for cleaning the interior pipeline surface.

14. A pig launcher according to claim 13 wherein the pig includes at least one brush attached to its exterior surface.

15. A pig launcher according to claim 13 wherein the pig includes at least one scraper attached to its exterior surface.

16. A pig launcher according to claim 13 wherein the pig includes a multiplicity of brushes and scrapers attached to its exterior surface.

17. A pig according to claim 1 wherein a portion of the pig is made of a metallic material.

18. A pig according to claim 17 wherein the metallic material is steel.

19. A pig according to claim 1 wherein a portion of the pig is made of a flexible material.

20. A pig according to claim 19 wherein the flexible material is an elastomer.

* * * * *